(12) United States Patent
Sims et al.

(10) Patent No.: US 8,689,300 B2
(45) Date of Patent: Apr. 1, 2014

(54) METHOD AND SYSTEM FOR GENERATING DIGITAL FINGERPRINT

(75) Inventors: John B. Sims, Littleton, CO (US); Jeffrey W. Calog, Morrison, CO (US)

(73) Assignee: The Boeing Company, Chicago, IL (US)

( * ) Notice: Subject to any disclaimer, the term of this patent is extended or adjusted under 35 U.S.C. 154(b) by 1426 days.

(21) Appl. No.: 11/668,771

(22) Filed: Jan. 30, 2007

(65) Prior Publication Data

US 2008/0184029 A1 Jul. 31, 2008

(51) Int. Cl.
*H04L 29/06* (2006.01)

(52) U.S. Cl.
USPC .............. 726/7; 726/19; 713/154; 713/158; 713/168; 713/181

(58) Field of Classification Search
None
See application file for complete search history.

(56) References Cited

U.S. PATENT DOCUMENTS

| | | | | |
|---|---|---|---|---|
| 5,768,381 A * | 6/1998 | Hawthorne | .................... | 380/284 |
| 6,769,060 B1 * | 7/2004 | Dent et al. | .................... | 713/168 |
| 6,792,113 B1 * | 9/2004 | Ansell et al. | .................... | 380/284 |
| 7,294,056 B2 * | 11/2007 | Lowell et al. | .................... | 463/17 |
| 7,496,756 B2 * | 2/2009 | Oka et al. | .................... | 713/175 |
| 7,730,321 B2 * | 6/2010 | Gasparini et al. | ............. | 713/182 |
| 8,001,387 B2 * | 8/2011 | Lee et al. | .................... | 713/186 |
| 2001/0045451 A1 * | 11/2001 | Tan et al. | .................... | 235/375 |
| 2002/0095507 A1 | 7/2002 | Jerdonek | | |
| 2004/0098350 A1 * | 5/2004 | Labrou et al. | .................... | 705/64 |
| 2006/0129847 A1 * | 6/2006 | Pitsos | .................... | 713/193 |
| 2007/0150299 A1 * | 6/2007 | Flory | .................... | 705/1 |
| 2007/0201502 A1 * | 8/2007 | Abramson | .................... | 370/429 |
| 2007/0261112 A1 * | 11/2007 | Todd et al. | .................... | 726/11 |

FOREIGN PATENT DOCUMENTS

| | | | |
|---|---|---|---|
| WO | WO 2004019640 A1 * | 3/2004 | ............... H04Q 7/38 |
| WO | WO2005039099 | 4/2005 | |

OTHER PUBLICATIONS

Meddahi, A.; Masmoudi, K.; Afifi, H.; M'Hamed, A.; Hajjeh, I. Enabling Secure Third Party Control on Wireless Home Networks. ASWN 2004. Pub. Date: 2004. Relevant pp. 46-54. Found on the World Wide Web at: http://ieeexplore.ieee.org/stamp/stamp.jsp?tp=&arnumber=1437494.*

European Examination Report for corresponding European Application No. 087056388, dated Sep. 5, 2013, 5 pages.

* cited by examiner

*Primary Examiner* — Cordelia Zecher
*Assistant Examiner* — Jeremiah Avery
(74) *Attorney, Agent, or Firm* — Harness, Dickey & Pierce, P.L.C.

(57) ABSTRACT

A method and system for authenticating the identity of a client device that is calling a remotely located server over a network. A client device inputs information pertaining to a hardware characteristic and a network address thereof into a cryptographic hash function stored on the client device. The hash function computes a unique registration ID hash code and presents it to the system server during a registration process. The system server then generates a digital certificate having a system-side key (i.e., public key). A client-side key (i.e., private key) is provided to the client device. For all future calls to the system server, the client device re-computes its registration ID hash code and then digitally signs it using its client-side key. The system server then uses its system-side key to examine the digitally signed registration ID hash code to authenticate the identity of the client device. Since the registration ID hash code is not stored on the client device, but rather re-computed each time the client device makes a call to the system server, a high degree of security is achieved.

21 Claims, 4 Drawing Sheets

METHOD AND SYSTEM FOR GENERATING DIGITAL FINGERPRINT

FIELD

The present disclosure relates to methods and systems for authorizing and verifying the identity of a first device that is attempting to access, over a network, a second device, and more particularly to a method and system for generating a digital fingerprint of a client device that is attempting to access a system, in order to verify the identity of the client device before permitting an information exchange with the system.

BACKGROUND

The statements in this section merely provide background information related to the present disclosure and may not constitute prior art.

The distribution of information from a system, for example a system server, to a client device that is communication with the system server via network, requires an assurance that the client device is authorized to receive the content that it is requesting from the system server. This is especially so with automated or "hands-free" (i.e., without a user present) distribution of information from a system to a client device. The client device must be uniquely identified and known to the system before the system transmits information to the client device. Put differently, the identity of the client device must be verified by the system server before the system server begins releasing information to the client device.

Existing approaches that attempt to provide assurance of the identity of a requesting device often have relied on the use of computer names, user names, or installed software on the client device. Such security measures, by themselves, are often easily defeated by unauthorized third parties or "hackers". This can result in confidential or sensitive information being misdirected from the system server to a non-authorized device that has accessed the network and is attempting to communicate with the system server.

Attempts to alleviate the shortcomings of pre-existing assurance systems have often involved cumbersome procedures that must be followed by a client device or individuals associated with operation of a client device. Such systems have often resulted in additional costs, but with little real additional security being gained.

SUMMARY

The present disclosure is directed to a method and system for assuring the identity of a first device that is attempting to access and obtain information from a second device on a network. In one example, the first device comprises a client device and the second device comprises a system or server having information that the client device is attempting to obtain.

In one exemplary implementation the method involves reading a network address of a component of the client device, in addition to reading a predetermined piece of information from the client device that pertains to a hardware component incorporated in the client device. A cryptographic program is used to receive the network address and the predetermined piece of information as inputs and to compute a registration Identification (ID) code for the client device.

During an initial, one time only registration procedure where the client device is registered with the system, the client device supplies the computed registration ID code, and at least one additional piece of user identifying information, to the system when making a call to the system over the network. The system uses the registration ID code and the piece of user identifying information to generate a digital certificate and a public/private key pair that is uniquely associated with the client device. The public/private key pair comprises a client-side or "private" key, and a system-side or "public" key. The client-side key (i.e., the private key) is provided to the client device. The client-side key is stored on a mass storage device associated with the client device for use in authenticating the identity of the client device in future communication sessions. The system-side key is stored on a mass storage device associated with the system, for use in validating the client-side key that will be presented by the client device in future communications sessions. When the client device calls the system at some later time to establish a new communications session (after the initial registration procedure has been performed), the client device re-computes its registration ID code and digitally signs it using its stored client-side key. It then presents the digitally signed registration ID code to the system. The system compares the digitally signed registration ID code using its digital system-side key. If the signature is valid, then the authenticity of the identity of the client device is verified, and the system permits further communication with the client device.

In one exemplary implementation, the method involves using a registration program operating on the control device to read a network address of a network card of the client device, and also to read a volume serial ID number of a mass storage device on the client device. A cryptographic hash program uses the network address and the volume serial ID number as inputs and computes therefrom a unique registration Identification (ID) hash code for the client device. The client device presents the registration ID hash code together with the additional piece of user identifying information to the system during the initial registration procedure to obtain its client-side digital key. The system stores the registration ID hash code for future use.

In one exemplary implementation, the additional piece of user identifying information may include one or more of a user name, a user password, and a user selected registration name for the client device. Upon recognizing the client device during the initial registration process, the system then generates the digital certificate and related public/private key pair.

A particular advantage of the present method is that the registration ID hash code is re-computed every time the client device makes a new call to the system. Since it is not stored on the client device, this significantly reduces the possibility of a third party or unauthorized device obtaining it and using it to try and gain access to the system. When making a subsequent call to the system (i.e., a new call after the initial registration process has been performed), the client device re-computes the registration ID hash code and digitally signs it using its client-side key. The digitally signed registration ID hash code is then presented to the system and the system compares the digital signature with its system-side key to authenticate the identity of the client device.

The various implementations of the method of the present disclosure provide exceptionally strong security for authenticating the identity of the client device without requiring significant cooperation, expense, or significant technical steps to be taken by operators of the client device.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
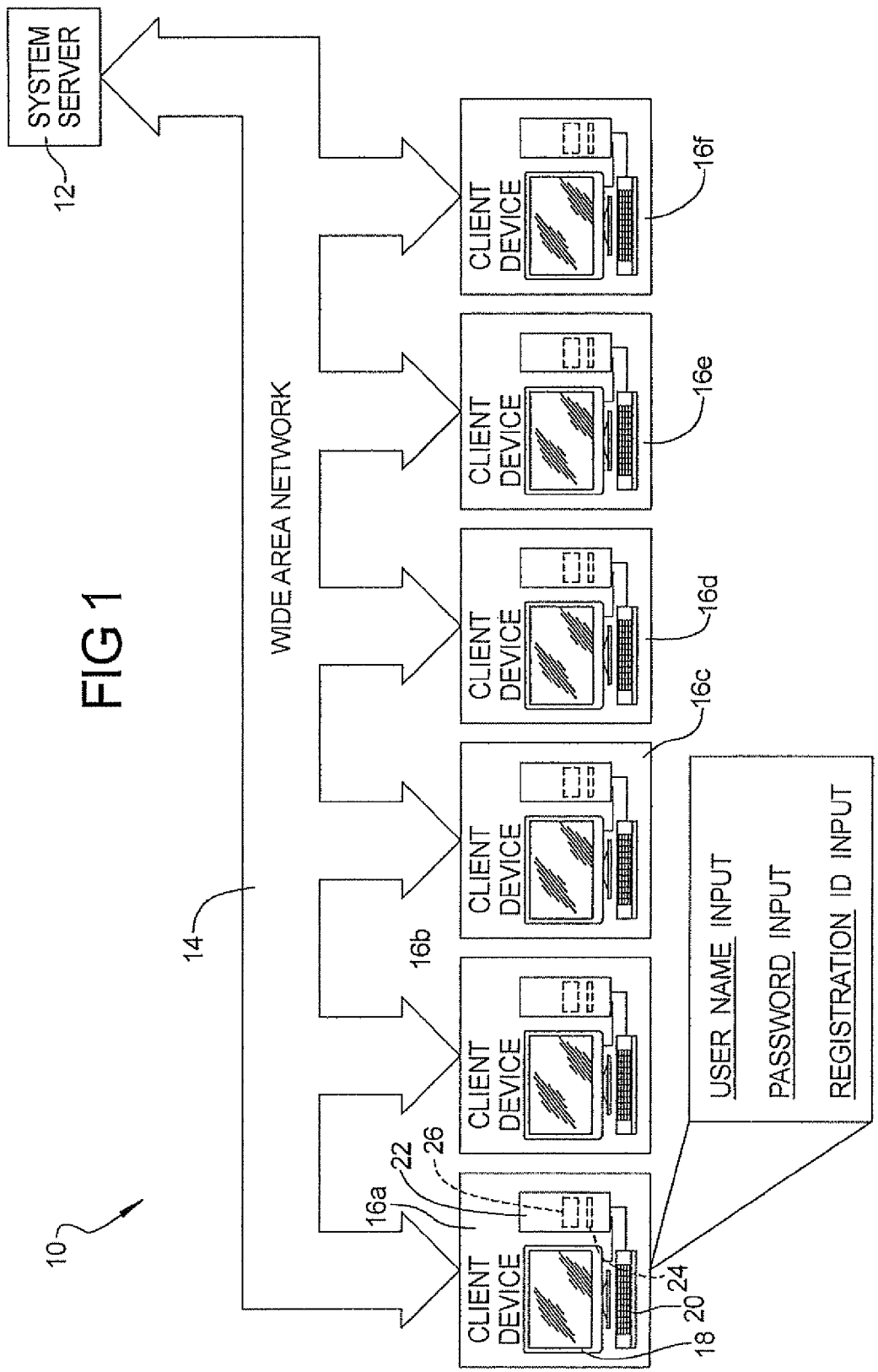
FIG. 1 is an environmental block view diagram illustrating a typical environment in which the method of the present disclosure may be employed, in which a client device is in communication over a wide area network with a remotely located system server.

Referring to FIG. 1, a system 10 is shown that makes use of the method of the present disclosure. In this example, the system 10 includes a system server 12 that is remotely coupled via a wide area network 14, for example the Internet, with at least one client device 16a-16f. The illustration of a plurality of client devices 16a-16f is merely meant to illustrate that in a typical scenario more than one client device 16 will often be operating on the network 14 and capable of bi-directional communication with the system server 12. Each client device 16a-16f typically comprises a computer terminal having a display terminal 18, a keyboard 20 for data entry, and a computing module 22. The computing module 22 typically includes a networking card 24 and a mass storage device, for example a hard disc drive 26. The client devices 16a-16f may each be identical or they may be of slightly different configurations, but in any event each represents a computing device that is able to make a call to the system server 12 and bi-directionally communicate over the wide area network 14 with the system server 12.

Figure 2:
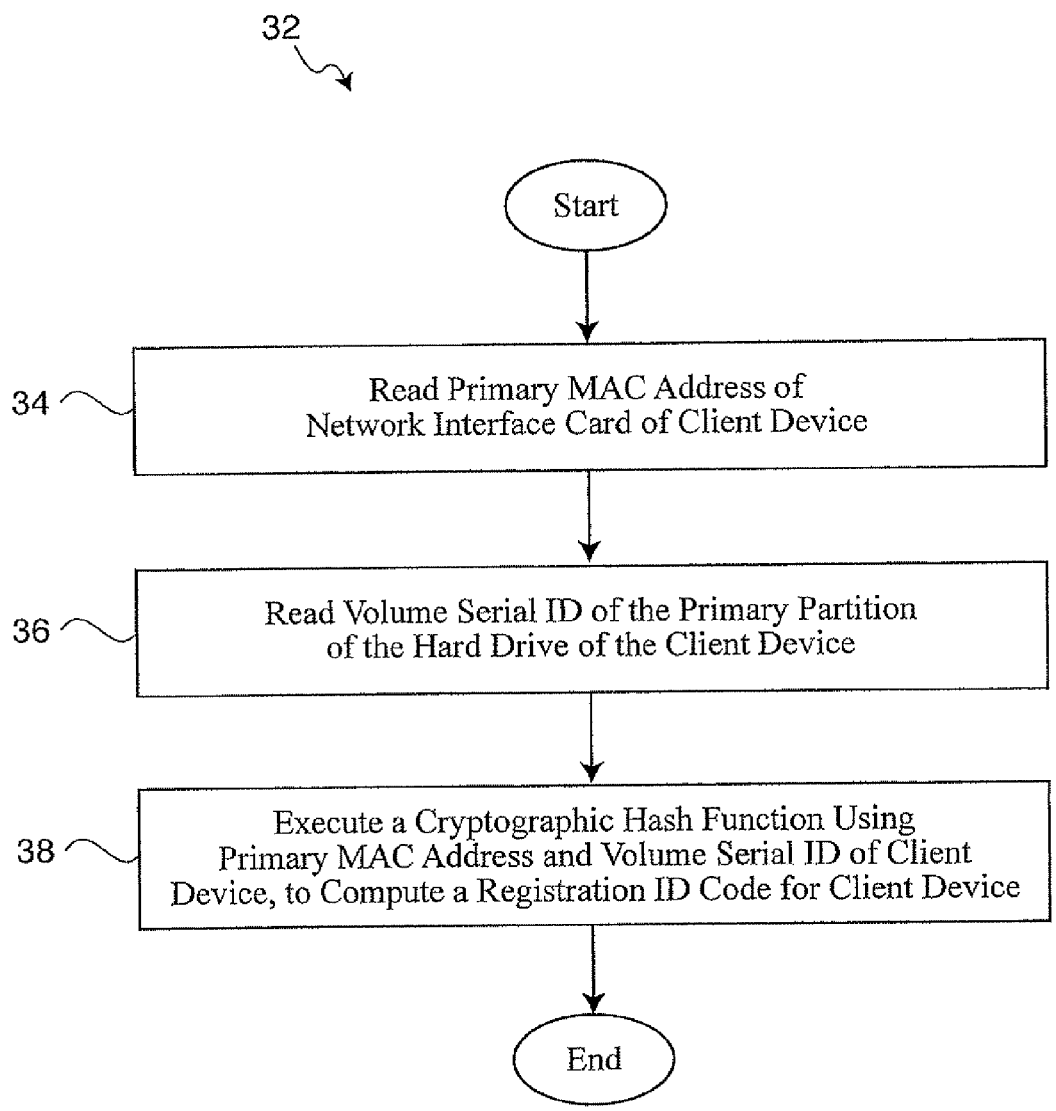
FIG. 2 is a flowchart of an exemplary method for generating a registration ID code for the client device shown in FIG. 1.

Referring to FIG. 2, a flowchart 32 illustrates an exemplary process for computing a registration Identification (ID) code in accordance with the present disclosure. The registration ID code is used during an initial registration process when the client device 16 is first registered with system server 12, and is re-computed each time the client device 16 makes a new call to the system server 12. The computation of a registration ID code enables a unique code to be created that takes into account specific hardware features of the particular client device 16 that uniquely identifies it to the system server 12. A particular advantage is that the registration ID code is uniquely tied to the particular client device 16 making the call to the system server 12.

In operation 34, the primary MAC address of the network interface 24 in the computing module 22 of the client device 16 is read. In operation 36, the volume serial ID number of the primary partition of the hard drive 26 of the computing module 22 of the client device 16 is read. In operation 38, a cryptographic hash function is executed using the primary MAC address and the volume serial ID number of the client device 16 to compute a registration ID code for the client device 16. It will be appreciated that the operation set forth in FIG. 2 is performed each time a new call is made by the client device 16 to establish a new information exchange session with the system server 12.

The cryptographic hash function performed in operation 38, in this example, is preferably a one-way cryptographic function that generates a unique sequence of bits or "hash code". One specific type of cryptographic hash function that is suitable for use is known as the "Whirlpool" cryptographic hash function developed by V. Rijmen and P. Barreto. However, any suitable cryptographic function may be employed, provided that its inputs will be virtually impossible to deduce from examining its output code. The Whirlpool cryptographic hash function operates on messages less than $2^{256}$ bits in length, and produces a message digest of 512 bits. The cryptographic hash function can be mathematically proven to generate a given hash code, given the same inputs, each time it is executed. Furthermore, given the hash code output alone, the inputs to the hash function are virtually impossible to deduce. A cryptographic hash function is further highly resistant to attempts to guess the inputs by repeated, minor modifications to the inputs and then repeatedly examining the resulting hash code.

Another significant benefit of the present method is that the registration ID code is automatically computed from the underlying hardware environment of each client device 16 each time the client device 16 is used. Thus, the registration ID code is never stored on the hard drive 26 of the client device 16, and is therefore not susceptible to being obtained by an unauthorized device that may gain access to the network 14.

Figure 3:
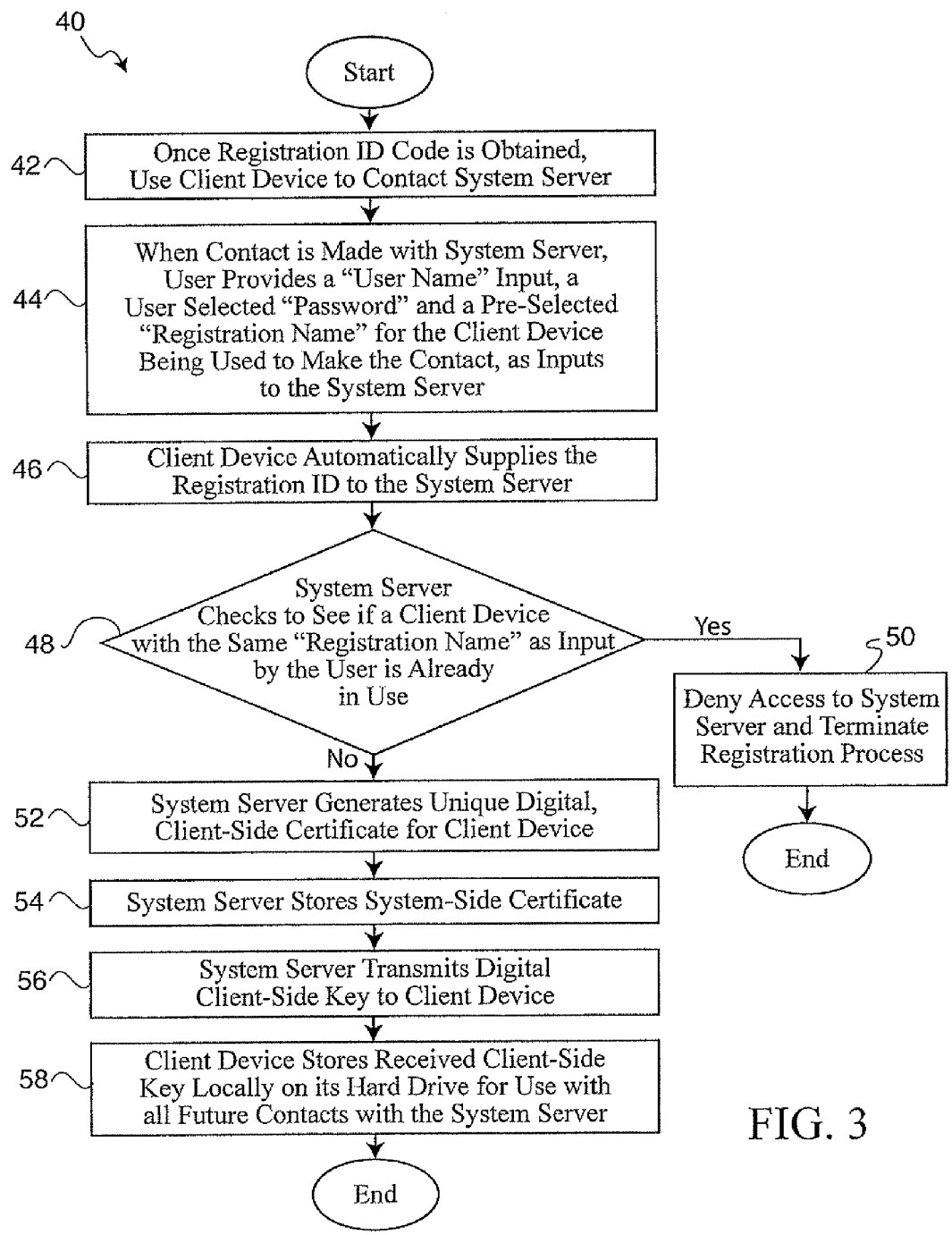
FIG. 3 is a flowchart of an exemplary method of the present disclosure for initially registering the client device with a system server.

Referring now to FIG. 3, a flowchart 40 is presented that illustrates an exemplary, initial registration process for registering a given client device 16 with the system server 12. In general, this process involves using the registration ID code to identity the client device 16 to the system server 12, and using the system server 12 to generating a unique digital certificate and private/public key pair associated with the client device 16.

In operation 42, once the registration ID code is obtained, the client device 16 is used to contact the system server 12. In operation 441 when initial contact is made with the system server 16, the user operating the client device 16 preferably provides a "User Name" input, a user selected "Password", and a pre-selected "Registration Name", as inputs to identify the client device 16 to the system server 12. It is preferred that all three such inputs are provided, although it will be appreciated that a high level of security would still be obtained even if only one or two of the above-mentioned user selected identifying items were supplied. The system server 12 will have previously stored this information, and thus is able to use this identifying information to identify the client device 16 during the initial registration process.

In operation 46, the client device 16 automatically supplies the Registration ID code that has been immediately, previously computed to the system server 16. In operation 48, the system server 16 checks to see if a different client device with the same "Registration Name" as that input by the user is already in use. If the answer to this inquiry is "YES", then access to the system server 12 is denied and the process of registering the client device 16 with the system server 12 is terminated, as indicated at operation 50.

In operation 52, the system server 12 then generates a unique digital certificate having a first component comprising a client-side (i.e., "private") key, and a second component comprising a system-side (i.e., "public") key. The digital certificate is unique to the specific client device 16 being registered for use with the system server 12.

In operation 54 the system server 12 stores the system-side key on its associated mass storage device. In operation 56, the system server 12 transmits the client-side key to the client device 16. In operation 58, the client device 16 stores the received client-side key locally on its hard drive 26. This client-side key will then be used by the client device 16 to digitally sign its registration ID hash code each time the client device 16 call the system server 12 to establish a new information exchange session.

One style of suitable digital certificate that the system server 12 may generate is an X.509 style digital certificate. However, it will be appreciated that any other style of digital certificate may be generated by the system server 12, provided it enables a suitable "key" to be generated that the client device 16 can use to digitally sign its registration ID hash code.

Figure 4:
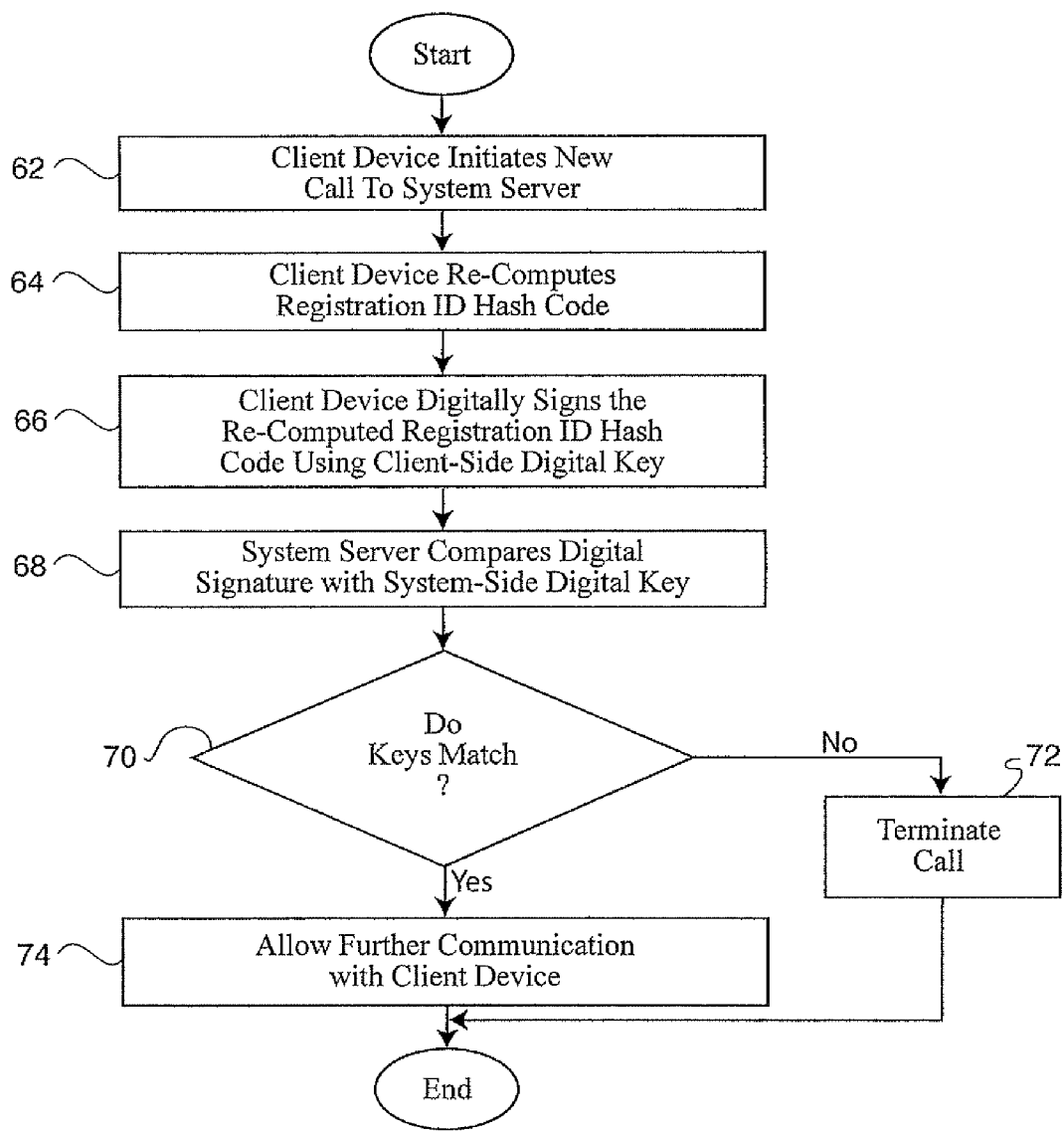
FIG. 4 is a flowchart illustrating the steps performed in making a subsequent call to the system server.

Referring now to FIG. 4, when the client device 16 completes the initial registration process of FIG. 3, it may make future calls to the system server 12 and use the client-side key that was obtained during the initial registration process as a further measure of security. For example, at operation 62, the client device 16 initiates a new call to the system server 12. The client device re-computes the registration ID hash code, as indicated at operation 64. The client device 16 then digitally signs the re-computed registration ID hash code, as indicated at operation 66, and presents it to the system server 12 to authenticate its identity. The system server 12, at operation 68, compares the digitally signed registration ID hash code being supplied by the client device 16 using its system-side key. The system server 12 makes a determination if the digital signature is valid, as indicated at operation 70. If a match does not exist, the call is terminated, as indicated at operation 72. If a match exists, then the system server 12 allows further communication with the client device 16, as indicated at operation 74.

The method of the present disclosure provides a significant benefit in that cumbersome and/or costly security procedures are not required by users of the client device 16. Since the registration ID hash code is obtained from a combination of factors derived from the hardware characteristics of the particular client device 16, the network address of the client device 16, and credential information supplied by an individual operating the client device, it is computationally infeasible for an unauthorized device to generate a registration ID hash code that fraudulently identifies it as an authorized client device. Furthermore, an additional layer of security is provided because the credential information supplied by the user cannot be obtained or derived by reading any stored files on the client device. Still another layer of security is provided because the registration ID code is not stored on the client device 16, but rather generated each time the client device 16 calls the system server 12. Finally, another layer of security is provided by the client-side key that is used by the client device 16 to digitally sign the re-computed registration ID hash code before supplying it to the system server 12. These features, overall, enable an extremely high degree of certainty to be obtained when authenticating the identity of a particular client device that is attempting to establish communications with the system server 12.

While various implementations and embodiments have been described, those skilled in the art will recognize modifications or variations which might best made without departing from the present disclosure. The examples illustrate the various implementations and embodiments and are not intended to limit the present disclosure. Therefore, the description and claims should be interpreted liberally with only such limitation as is necessary in view of the pertinent prior art.

What is claimed is:

1. A method for assuring that a client device is authorized to receive information from a system, the system and the client device being in bi-directional communication over a network, the method comprising:
   reading a network address of said client device on said network;
   reading a predetermined piece of information from said client device pertaining to a hardware component incorporated in said client device;
   using a cryptographic program to receive said network address and said predetermined piece of information as inputs, and to compute therefrom a registration identification (ID) hash code for said client device, and wherein said registration ID hash code is not stored on said client device after said registration ID hash code is sent to said system;
   using said client device to supply said registration ID hash code to said system when making a call to said system over said network;
   using the system to provide the client device with a client-side key that is used by the client device to digitally sign said registration ID hash code;
   causing said system to generate a digital certificate having a component that is used by said system to validate a digital signature of said registration ID hash code that is provided by said client device to said system in future communications;
   for each subsequent call by said client device to said system, causing said client device to re-obtain said network address and said pre-determined piece of information as said inputs to said registration ID hash code, and to re-generate said registration ID hash code and to re-transmit said registration ID hash code to said system after signing said registration ID hash code with said client-side key; and
   further comprising using said client device to supply a pre-determined user name together with said registration ID hash code to said system.

2. The method of claim 1, wherein:
   generating a digital certificate comprises generating a digital certificate having a system-side key; and
   having said system use its said system-side key to compare to said digitally signed registration ID code when receiving a future call from said client device, to authenticate an identity of said client device.

3. The method of claim 1, wherein using a cryptographic program comprises using a cryptographic hash program stored on said client device.

4. The method of claim 1, wherein reading a predetermined piece of information comprises reading a volume serial number identification code of a primary partition of a mass storage device residing in said client device.

5. The method of claim 1, wherein reading said network address comprises reading a MAC address of a network card residing within said client device.

6. The method of claim 1, further comprising using said client device to supply a user password.

7. The method of claim 1, further comprising using said client device to supply a previously selected registration name for said client device.

8. The method of claim 7, further comprising using said system, upon receipt of said registration name from said client device, to check if another device using the same registration name as said client device is already in communication with said system.

9. The method of claim 7, further comprising causing said system to prohibit further communication with said system if said registration name is detected to be already in use by a device other than said client device.

10. The method of claim 7, further comprising storing said registration name and said registration ID code in a memory of said system.

11. A method for registering an identity of a client device that is making a call on a network and requesting information from a system operating on the network, the method comprising:
  reading a network address of a network card being used in said client device to enable communication on said network;
  reading a predetermined piece of information from said client device pertaining to a mass storage component incorporated in said client device;
  using a cryptographic hash program to receive said network address and said predetermined piece of information as inputs, and to generate therefrom a registration identification (ID) hash code for said client device that is not stored on said client device;
  using said client device to supply said registration ID hash code to said system when making a call to said system during a registration process;
  causing said system to use said registration ID hash code and said piece of user identifying information to generate a digital certificate unique to said client device, said digital certificate including a system-side key;
  providing a client-side key to said client device that is used in subsequent communications by said client device to digitally sign its registration ID hash code;
  storing said client-side key on said client device;
  storing a second system-side key on said system;
  for each subsequent call by said client device to said system, causing said client device to re-obtain said network address and said pre-determined piece of information as said inputs to said registration ID hash code, and to re-generate said registration ID hash code and then to sign the re-generated registration ID hash code with the client-side key before transmitting the signed, re-generated ID hash code to the system, and further such that the registration ID hash code is not stored by the client device after it is transmitted to the system; and
  further comprising using said client device to supply a pre-determined user name together with said registration ID hash code to said system.

12. The method of claim 11, further comprising:
  causing said system to compare its said stored system-side key with said digital signature applied to said re-generated registration ID hash code to authenticate an identity of said client device.

13. The method of claim 11, further comprising:
  using said client device to supply a previously selected registration name for said client device;
  causing said system, upon initial receipt of said registration name from said client device, to check if a different device, currently in communication with said system, is already using said registration name; and
  if said different device is already using said registration name, then causing said system to terminate said call.

14. The method of claim 11, further comprising using said client device to supply a pre-determined user password, together with said registration ID code, to said system.

15. A method for assuring that a client device is authorized to receive information from a system, the system and the client device being in bi-directional communication over a network, the method comprising:
  reading a network address of a network card being used in said client device to enable communication on said network;
  reading a volume serial ID number of a mass storage device of said control device;
  using a cryptographic hash program to receive said network address and said volume serial ID number as inputs, and to compute therefrom a unique registration identification (ID) hash code for said client device;
  using said client device to supply to said system, when contacting said system during an initial registration process, said registration ID hash code and a piece of user identifying information including a predetermined user name and at least one additional piece of information including:
    a user name; or
    a user password; or
    a user selected registration name for said client device;
  causing said system to use said registration ID hash code and said piece of user identifying information to register said client device as an authorized device, and causing said system to generate a digital certificate having a system-side key;
  providing a client-side key to said client device;
  storing said client-side key on said mass storage device of said client device;
  storing said system-side key on said system;
  each time when said client device makes a subsequent call to said system, causing said client device to re-obtain said network address and said volume serial ID number as said inputs to said registration ID hash code, and to re-compute said registration ID hash code;
  using said client-side key to digitally sign said re-computed registration ID hash code each time said registration ID hash code is re-computed by said client device;
  supplying said digitally signed, re-computed registration ID hash code to said system during each said subsequent call from said client device, and such that said registration ID hash code is not stored on said client device after supplied to said system; and
  causing said system to use said stored system-side key to examine said digitally signed, re-computed registration ID hash code to authenticate the identity of said client device.

16. The method of claim 15, wherein said client device presents all of said user name, said user password, and said user registration name to said system when calling said system.

17. An authentication system for assuring that a client device is authorized to receive information from a remote system, the remote system and the client device being in bi-directional communication over a network, the authentication system comprising:
  a client device having a network address and a cryptographic program, the cryptographic program adapted to receive said network address and a predetermined piece of information concerning said client device, as inputs, and said cryptographic program being adapted to compute therefrom a registration identification (ID) hash code for said client device each time a new call is made by said client device to said remote system such that said registration ID hash code is not stored on said client device after being transmitted by said client device, and such that said network address and said predetermined program are re-obtained as inputs for re-generating said registration ID hash code for each call made by said client device; and a system in communication with said client device over said network, that receives said registration ID code from said client device along with a predetermined user name and at least one additional piece of user identifying information, the system adapted to use said registration ID code and said one additional piece of identifying information to generate a digital certificate having a system-side component that is compared against a digitally signed registration ID code provided by said client device in each future communication from said client device to said system, wherein the digitally signed registration ID code is signed using a client-side key.

18. The system of claim 17, wherein said cryptographic program comprises a cryptographic hash program stored on said client device.

19. The system of claim 17, wherein said client device comprises a mass storage device, and wherein said predetermined piece of information comprises a volume serial number identification code of a primary partition of said mass storage device.

20. The system of claim 17, wherein said client device comprises a network card having an associated MAC address, said MAC address representing said network address of said client device.

21. The system of claim 17, wherein said one additional piece of user identifying information includes at least one of:
 a user password associated with a user operating said client device; and
 a registration name for said client device.

\* \* \* \* \*